United States Patent [19]
Carlyle et al.

[11] 3,778,767
[45] Dec. 11, 1973

[54] DYNAMIC DEBUG AID FOR COMPUTER DATA COMMUNICATION NETWORKS

[75] Inventors: Bert Edward Carlyle; Robert Louis Rawlings, both of South Pasadena; Karl Erich Volk, Sierra Madre, all of Calif.

[73] Assignee: Burroughs Corporation, Detroit, Mich.

[22] Filed: May 30, 1972

[21] Appl. No.: 257,578

[52] U.S. Cl. .................... 340/146.1 R, 235/153 A
[51] Int. Cl. .......................................... G08c 25/00
[58] Field of Search .................. 340/172.5, 146.1 R, 340/146.1 C; 235/153 A, 153 R, 153 AK

[56] References Cited

UNITED STATES PATENTS

| | | | |
|---|---|---|---|
| 3,491,340 | 1/1970 | Richman et al. | 340/172.5 |
| 3,518,413 | 6/1970 | Holtey | 340/172.5 |
| 3,585,599 | 7/1971 | Hitt | 340/172.5 |
| 3,659,273 | 4/1972 | Knauft et al. | 235/153 A |
| 3,710,350 | 1/1973 | Yoshitake | 340/172.5 |

*Primary Examiner*—Charles E. Atkinson
*Attorney*—Paul W. Fish et al.

[57] ABSTRACT

For trouble-shooting problems in synchronous, asynchronous, two-wire voltage, or two-wire current communication links between a terminal and a data processor, a line monitor observes the signals going to or coming from a terminal unit and sends them to the processor. The processor translates them into hexadecimal and mnemonic code messages, and causes their print-out, completely or selectively, along with an indication of the time of day the printed messages were received and the monitoring station (line monitor) they were received from.

21 Claims, 10 Drawing Figures

DYNAMIC DEBUG AID FOR COMPUTER DATA COMMUNICATION NETWORKS

BACKGROUND OF THE INVENTION

The present invention relates generally to improvements in the monitoring of digital communication networks, and more particularly pertains to a new and improved trouble-shooting tool for digital computer data communication networks wherein data signals in a communication link between a data processor and a terminal unit are monitored by hardware that facilitates the processing and display of this data by the data processor to which the communication link being monitored is connected.

In the field of trouble-shooting computer systems, the prior art has taken many different approaches to the problem of monitoring the system and analyzing the occurrences. One approach is to shut down the entire data processing system, either for a scheduled preventive maintenance period, or whenever an error is detected during normal operation by a monitoring apparatus. Another approach is to rely on the instructions contained in a test program subroutine to activate test logic circuits during a regular program run or during an emergency temporary interrupt of the normal program run. The instructions of the test program are executed by the data processor which also controls the execution of the regular program. Therefore, processing of the regular program is halted during the running of the test routine.

The problems that generally accompany the installation of a new computer communication network that will link a central data processor and a plurality of peripheral devices do not lend themselves to the same trouble-shooting approaches that are used for the data processor. Problems on a data communication link can be caused by malfunctioning line adapters, data sets (modems), telephone lines, or terminals. The prior art method of finding or isolating the particular piece of hardware that is causing a problem involved the use of external test equipment such as meters, oscilloscopes, or wave-form recorders. The wave-form recorders of the prior art, for example, utilize a fast strip line printer that records all the signal transitions (ones and zeros) that occur on the line being monitored. Only the signal transitions appearing on the line are recorded.

A great number of data bits (signal transitions) are sent over a communication link in one second. Thus, monitoring of data in this manner would generate voluminous records in a matter of minutes. The malfunctions that occur in data communication networks are time-dependent and sometimes intermittent. The record produced by a wave-form recorder makes it extremely difficult and tedious to view a problem in relation to the exact instant it occurs and impossible to view it at the instant that it occurs. Thus, prior art communication network trouble-shooting schemes involving data monitoring are either expensive and interfere with the normal operation of the computer system, or if relatively unsophisticated, either generate voluminous data which is practically impossible to utilize with any degree of effectiveness, or miss the occurrence of the problem entirely because of its intermittent nature and the ephemeral character of the display utilized.

SUMMARY OF THE INVENTION

It is therefore an object of this invention to provide a trouble-shooting tool for data communication networks that generates a physical printout of line events occurring on the data lines being monitored, recorded in such a way that referral to events occurring on the line at the time of their occurrence as well as at some later time can be easily made.

Another object of this invention is to provide a trouble-shooting tool that provides a physical printout of line events and the time of their occurrence.

A further object of this invention is the provision of a trouble-shooting tool for data communication links that is capable of being used on various types of communication links.

The foregoing objects and the general purpose of this invention are accomplished by a trouble-shooting system that observes the occurrence of communication signals on data communication links in a data communication network, interfaces these signals with a data processor to be translated into code messages, and outputs these code messages as a display, along with information identifying the particular link these messages are from, and the time they were received by the data processor. Circuitry in a data line monitor (DLM) permits the monitoring of data in synchronous, asynchronous, two-wire voltage or two-wire current communication links between a terminal and a data processor without loading the circuits in the communication link being monitored or interfering with the communication between the terminal and the data processor. The DLM interfaces the monitored data with the data processor's input/output network. The data processor is programmed to translate the DLM monitored data, selectively or entirely, into code messages, such as hexadecimal and mnemonic code, and provide a display of these code messages, along with information identifying the particular DLM that is sending these messages, the time of day the processor received these messages and the elapsed time between messages.

BRIEF DESCRIPTION OF THE DRAWINGS

Other objects and the attendant advantages of this invention will be readily appreciated as the same becomes better understood by reference to the following detailed description when considered in connection with the accompanying drawings in which like reference numerals designate like parts throughout the figures thereof and wherein.

DESCRIPTION OF THE PREFERRED EMBODIMENTS

Figure 1:
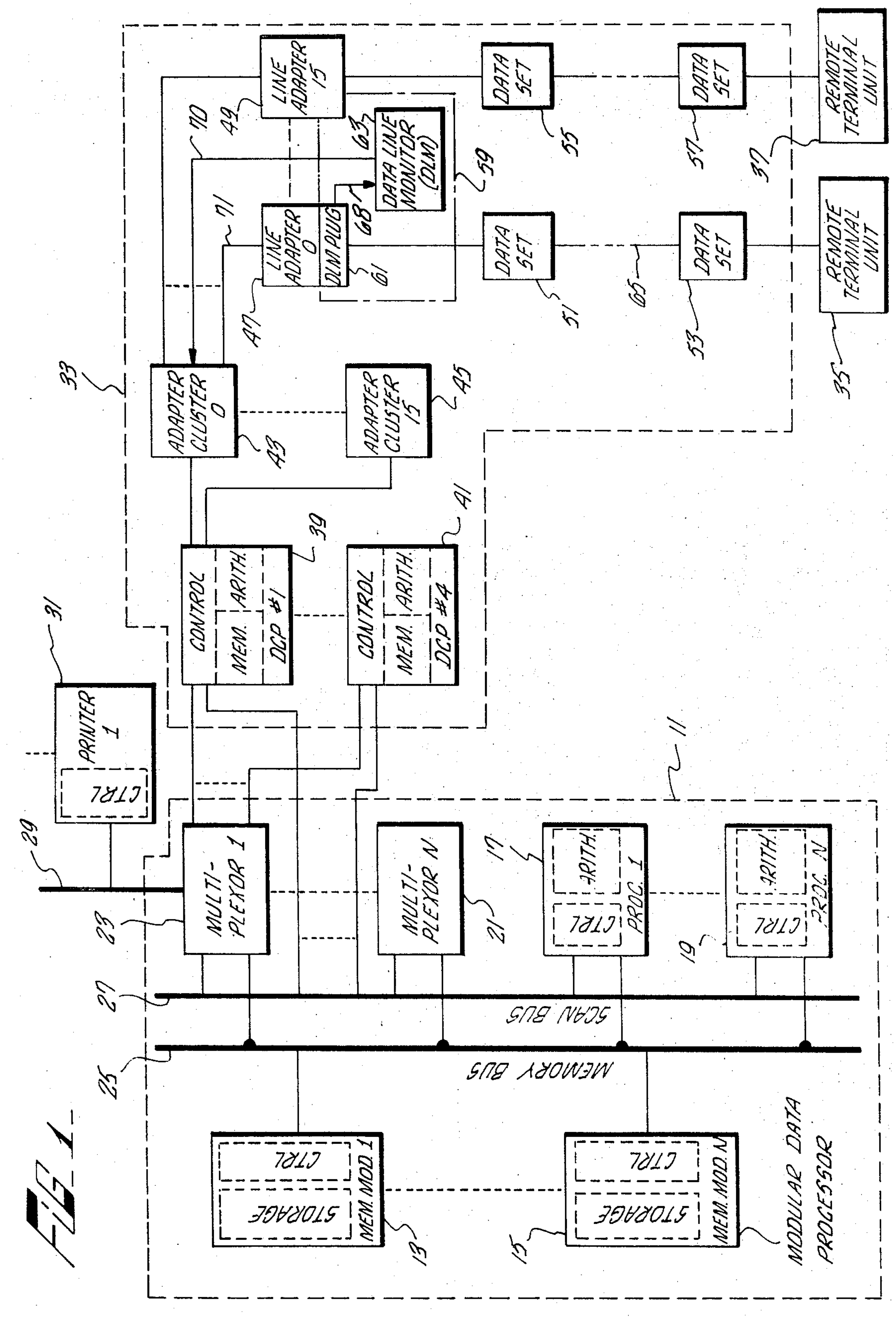
FIG. 1 is a block diagram of a central modular data processor and its communication network with the monitoring apparatus of this invention shown connected at a typical location in the communication network.

Referring first to FIG. 1, a data line monitor plug 61 and a data line monitor adapter 63 are shown located in a position that is typical of the relationship between the apparatus of this invention and a data communication network 33 that may be utilized with a central data processor system 11.

To provide a background for and a better understanding of our invention, a brief explanation of the function and interrelationship of the modular central data processor 11 and the data communication network 33 will be given first. Modular central data processors,such as illustrated in FIG. 1, are well known in the art. Examples of patents granted for modular data processors are: A Modular Multi-Computing Data Processing System by John T. Lynch et al. (U.S. Pat. No. 3,411,139), Modular Computer System by J. P. Anderson et al. (U.S. Pat. No. 3,419,849), and High Speed Modular Data Processing System by W. C. Presch et al. (U.S. Pat. No. 3,492,654). These patents are all assigned to the Assignee of the present invention. As explained in the above cited patents, modular data processor systems comprise memory modules, processor modules, and input/output modules, each module carrying its own control for communication between modules and between modules and terminals. The modular data processor 11 illustrated in FIG. 1 follows this organization scheme in that it has a plurality of memory modules 13, 15, a plurality of processor modules 17, 19, and a plurality of I/O modules or multiplexors 21, 23. The memory modules are connected to a memory bus 25 and each has a storage and control area. The processor modules are also connected to the memory bus 25 for communicatiion with the memory modules. The processor modules 17, 19 are additionally connected to a scan bus 27. Each processor module contains control and arithmetic areas. The input/output units or multiplexors 21,23 are connected to the memory bus 25 and the scan bus 27. These units permit peripheral equipment such as a printer 31 to communicate with the memory modules or the processor modules and permit the processors and memory modules to communicate with the peripheral equipment.

Each multiplexor, such as multiplexor 23, for example, has an I/O bus 29 on which a plurality of peripheral equipment such as printer 31 may be attached, along with tape systems, card readers, card punch apparatus, CRT display devices, paper tape readers, paper tape punch devices, etc. Each of these devices, as does printer 31, would have their own control unit. In addition, each multiplexor 21, 23 will have a plurality of data communication processors 39, 41 connected to it. As will be hereinafter explained, these data communication processors are part of the data communication network 33 between the central data processor and remotely located terminal units 35, 37. These processors perform the routine housekeeping tasks encountered in the receiving and transmitting of data. Examples of these tasks are; answering and terminating calls, observing formal line procedures, polling repetitiously, and handling line discipline message formatting. An example, and description, of a data communication processor used to perform the housekeeping tasks encountered in a communication network can be found in the patent for Data Processing Apparatus by C. C. Perkins et al. (U.S. Pat. No. 3,564,509) which is assigned to the Assignee of this application.

Each data communication processor such as DCP 39, for example, has access to the main memory modules through its multiplexor 23. The processor modules 17, 19 communicate with the DCPs 39, 41 by way of scan bus 27. Once a DCP has been initiated by the system it functions as a separate and distinct data processor, fetching and executing its instructions until further control is exercised by the central data processing system. A much more detailed description of a data processor that functions similarly to the DCPs of FIG. 1 can be obtained in the aforementioned patent (U.S. Pat. No. 3,564,509) to Perkins et al.

The data communication network illustrated in FIG. 1 further comprises a plurality of cluster adapter modules 43, 45 for each DCP unit, such as DCP 39, for example. These adapter cluster modules serve as an interface between the DCP and a plurality of line adapters, such as adapters 47, 49, for example. A cluster adapter module acts as a multiplexor in serving a plurality of line adapters. The primary function of an adapter cluster module is to exchange characters with its DCP and to exchange characters with its line adapters. An adapter cluster module only has the ability to detect or generate synch characters. The adapter cluster module is dependent upon the DCP to provide control information for each and every line adapter connected to the cluster module. After an adapter operation is initiated by the DCP, the line adapter initiated will continue to operate under the control of the adapter cluster until additional control is required from the DCP, in which case an interrupt is sent to the DCP. A detailed description of the structure and operation of an adapter cluster module may be obtained from a patent to James E. Wollum for Digital Data Communication Multiple Line Control (U.S. Pat. No. 3,618,037) which is assigned to the Assigned of this application.

As explained in the above cited patent (U.S. Pat. No. 3,618,037) to James E. Wollum, each adapter cluster module may accommodate up to 16 line adapters. The line adapters 47, 49 connected to adapter cluster module 43, for example, serve as an interface between their adapter cluster module 43 and their communication line. Each communication line requires a suitable line adapter to match the system with the characteristics of the data set (modem) on the line, or in the case of a direct connection, the line itself. The primary function of the line adapters is to exchange data bits between the adapter cluster module and the communication line. A line adapter also monitors the communication line for controlling functions. These control functions vary according to the type of communication line used. Because of the variety of types of communication lines, more than one type of line adapter is required to handle them all. The types of line adapters with which our invention is designed to function most efficiently is the modem connect adapter and the direct connect adapter.

The modem connect adapter is used for synchronous and asynchronous data transmission in the half-duplex mode. It interfaces directly with data sets using EIA and CCITT defined interfaces. The direct connect adapter interfaces directly with a remote terminal using a two-wire voltage or current interface and accommodates asynchronous data transmission. Only half-duplex data transmission has been illustrated in FIG. 1.

The data sets or modems 51, 53, 55, 57 utilized in long distance data communications are well known in the art. The above mentioned patents (U.S. Pat. Nos. 3,618,037 and 3,564,509) to Perkins et al. and Wollum respectively, describe in much greater detail how these modems or data sets are utilized. The type of data sets the lines required is primarily determined by the type of terminal units 35, 37 that communicate with the central data processor. Examples of apparatus that may function as a remote terminal are the Burroughs TC500, the Burroughs Information Display Station, the IBM 1050 or a Model 33 Teletype unit. Whenever a remote terminal unit has to transmit its data over public exchange lines, data sets are required. However, for short distances direct connect two-wire voltage and two-wire current line adapters may be used without the data sets.

Data sets, as is well known, modulate digital data onto an analog carrier to be transmitted over long distances by way of public or special communication lines. The data signals between line adapter 47 and data set 51, for example, is still in digital form, therefore. It is at this point that a data line monitor plug 61 taps into the communication link. The data is sent to DLM 63 for interfacing with the adapter cluster module 43. This module 43 responds to DLM 63 in the same way that it responds to line adapters 47 and 49, passing the data received from the DLM to the DCP 39, where it is processed accordingly and quite differently from regularly received data.

Figures 2, 8, 9:
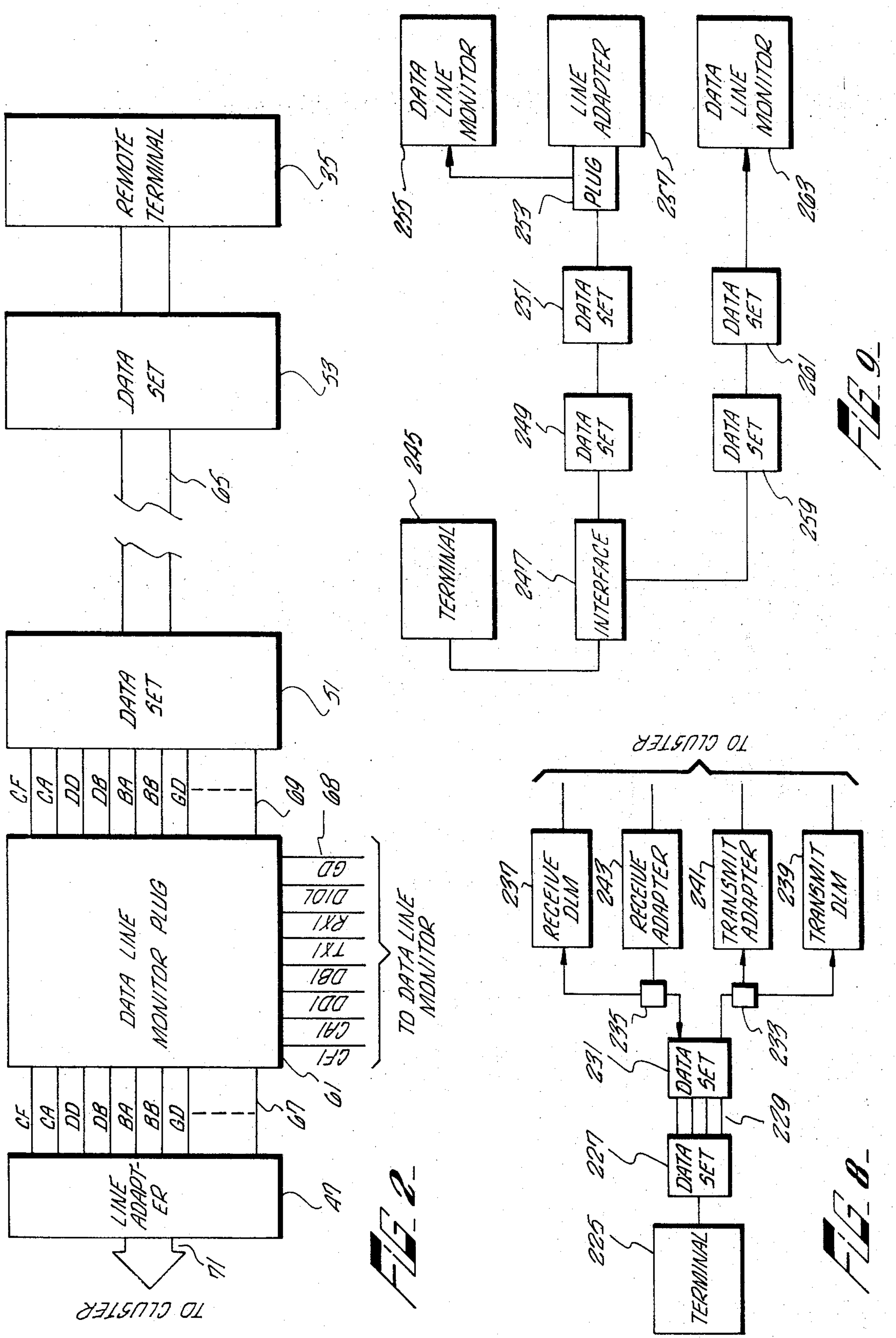
FIG. 2 is a block diagram of some of the equipment that is placed between a remotely located terminal and the I/O circuitry of a data processor, and shows the data line monitor plug of this invention located in a position for monitoring data.
FIG. 8 is a block diagram of a full duplex communication link illustrating how this type of link could be monitored by the present invention.
FIG. 9 is a block diagram of a duplex communication link illustrating how the present invention could be used to monitor more than one location on such a communication link.

Referring now to FIG. 2, the DLM plug 61 is illustrated with greater particularity as being located between a line adapter 47 and a data set 51. The communication channel 65 between the data set 51 at the system end and the data set 53 at the remote terminal could be a public exchange or private telephone lines. The remote terminal 35, as was mentioned earlier, could, for example, be a Burroughs TC500, BIDS or a Teletype unit. Line adapter 47 interfaces the data set 51 with the adapter cluster module over a cable 71 or by being directly plugged into the adapter cluster.

Depending upon the type of data set being used, there are many different control lines that must be interfaced with an adapter cluster module. The lines 69 from the data set 51 to the DLM plug 61 are identical to the lines 67 from the DLM plug 61 to the line adapter 47. In the particular example of FIG. 2, the communication lines 69, 67 between the data set and line adapter are labelled only to the extent necessary to show synchronous and asynchronous data transmission between a remote terminal unit 35 and an adapter cluster module. The lines are CF (received line signal detector) CA (request to send), DD (receiver signal timing), DB transmitter signal timing), BA (transmitted data), BB (received data) and GD (ground). There are other control lines passing between the data set and the line adapter. However, only these particular lines are shown as tapped by DLM plug 61. The particular structure of the DLM plug 61 for making connection with these lines does not constitute our invention and would be well within the purview of a person of ordinary skill in the art.

A cable 68 carries signals tapped by DLM plug 61 to the DLM 63 (FIG. 1). This cable is illustrated as having a signal detector line (CFI), request to send line (CAI), receiver signal timing line (DDI), transmitter signal timing line (DBI), transmitted data line (TXI), received data line (RXI), ground (GD), and a line for direct input/output level (DIOL) which is active, as will be explained, when a remote terminal such as TC500 or BIDS is not going over a public interchange but over a direct two-wire voltage or current interface. If the remote terminal 35 were a Teletype unit, for example, using a direct current interface, only the received data line (RXI) would be active, as will be hereinafter explained.

Figure 3:
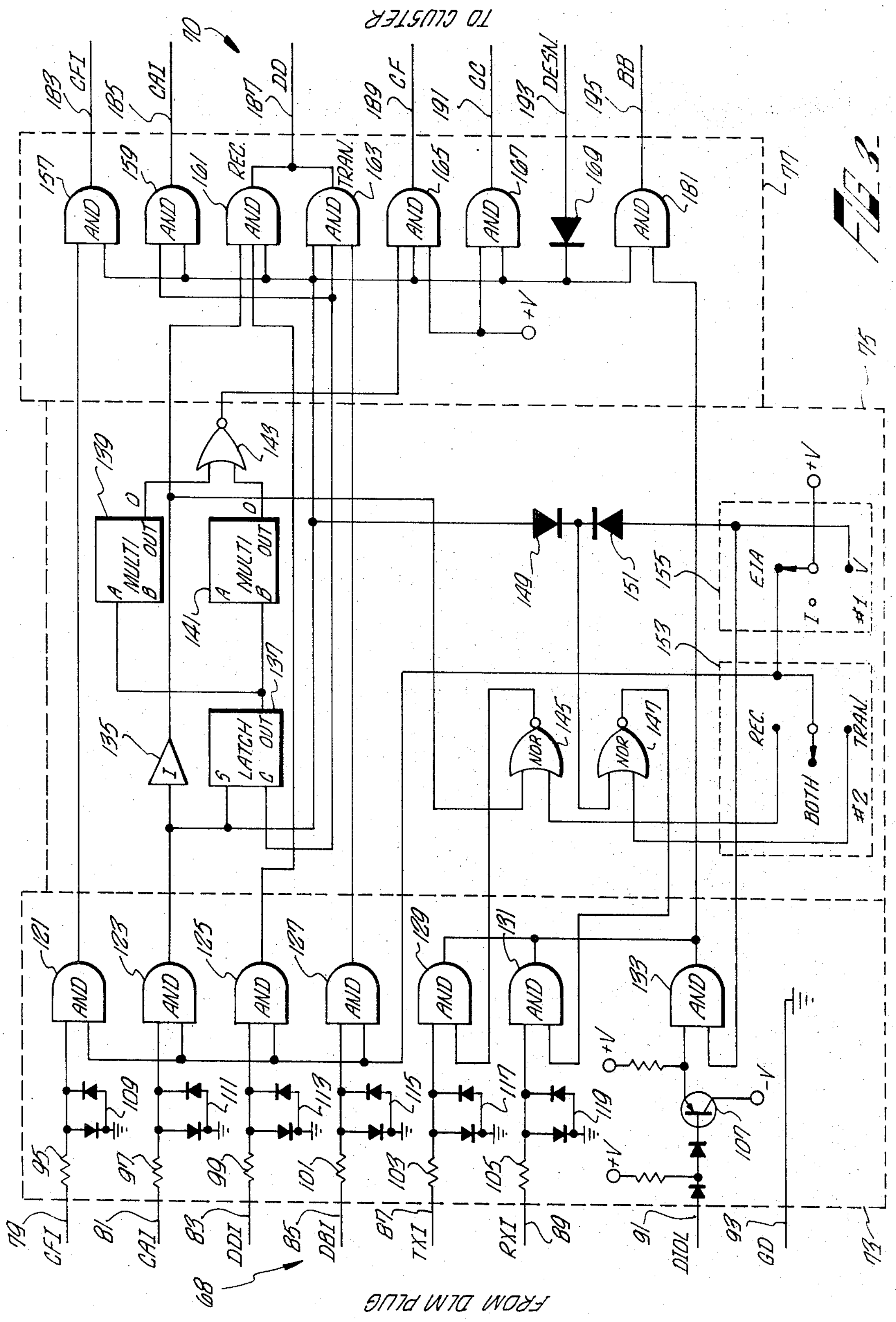
FIG. 3 is a logic circuit diagram of the basic circuitry utilized in the monitor adapter of this invention.

Referring now to FIG. 3, the cable 68 from DLM plug 61 connects to a data set interface section 73 of the DLM circuitry. The control and clock lines CFI line 79, CAI line 81, DDI line 83, DBI line 85, and the data lines, TXI line 87 and RXI line 89, are all connected to high impedances 95, 97, 99, 101, 103, 105 respectively, to prevent the loading of the data set and line adapter circuits. Control diodes 109, 111,113,115, 117, and 119 are connected, respectively, to the above recited lines to ensure that the signal level on these lines does not exceed a predetermined level nor fall below a predetermined level required by the adapter cluster logic elements. Each of the lines 79, 81, 83, 85, 87, and 89 from DLM plug 61 is connected to a high impedance input AND gate 121, 123, 125, 127, 129 and 131 respectively. These AND gates also help prevent the loading of the line adapter and data set circuits.

The direct voltage interface (DIOL) line 91 is connected to a voltage level change transistor 107 which appropriately varies the voltage on the line to a level required by the circuits of the DLM. The output of this voltage level change transistor is supplied to the input of an AND gate 133. Ground line 93 is brought into the DLM circuitry. The various control signal and data signal lines coming into the data set interface section 73 of the DLM are routed and switched by the switching logic section 75 of the DLM and are supplied to the adapter cluster module through the cluster interface section 77 of the DLM.

Two selector switches 153 and 155 in the switching logic section 75 of the DLM determine the operating mode of the DLM. The DLM can operate to interface synchronous or asynchronous duplex data transmission, monitoring both the received and transmitted data, or simply the received or the transmitted data. The DLM can also operate with a direct connect current interface or voltage interface. When operating with a direct connect interface, however, both the receive and transmit data flow is monitored.

Assuming that switch 155 is placed in the EIA position and switch 153 is placed in the BOTH position, the DLM will route both transmitted and received data, along with the appropriate control signals, to the cluster adapter module. With switch 155 in the EIA position, a positive voltage level is placed at the inputs of AND gates 121, 123, 125 and 127, thereby enabling these gates and permitting the signals levels on lines 79, 81, 83 and 85 to pass into the switching logic section 75.

Data AND gates 129 and 131 are enabled depending on the signal level on the request to send (CAI) line 81. If the request to send line 81 is high, indicating that the central data processor desires to send data to the terminal unit, a high is placed at one of the inputs of NOR gate 147, through isolation diode 149. This causes NOR gate 147 to have a low at its output, thereby placing a low at the input of AND gate 131, inhibiting that AND gate. Thus, receive data line (RXI) 89 is not routed to the cluster interface. At the same time, because of inverter 135, a low is placed at one of the inputs of NOR gate 145. Since the other input to NOR gate 145 is also low, NOR gate 145 has an output that is high which is placed at one of the inputs of AND gate 129, enabling that AND gate. Thus, the transmit data (TXI) line 87 is routed to the adapter cluster module by way of AND gate 181. Conversely, when the request to send line 81 is low, indicating that the data processor is desiring to receive data, a low is placed at one of the inputs of NOR gate 147, through isolation diode 149. Since its other input is also low, because of the selector location of switch 153, NOR gate 147 will have an output that is high, thereby enabling AND gate 131 and permitting receive data (RXI) line 89 to be routed to the adapter cluster module by way of AND gate 181. At the same time that CAI is low, because of inverter 135, a high is placed at one of the inputs of NOR gate 145 which causes NOR gate 145 to have an output that is low. This output is placed at one of the inputs of AND gate 129, inhibiting transmit data (TXI) line 87.

As long as the selector of switch 155 is in the EIA position, AND gate 133 is inhibited, because one of the inputs of AND gate 133 has a low placed on it while the selector is in this position. Therefore, the direct voltage input level (DIOL) line 91 is inhibited while the selector of switch 155 is in the EIA position.

The cluster interface section 77 of the DLM consists of AND gates 157, 159, 161, 163, 165, 167, 181 that are enabled by the adapter cluster module over designate (DESN) line 193 through isolation diode 169. In other words, every time that the adapter cluster module 43 (FIG. 1) is ready to receive information, a designate pulse is sent to the DLM over designate line 193. The signal levels on carrier detect line 79 from the data set go to an input register in the adapter cluster module 43 by way of AND gate 157 and line 183. This information is available for interrogation by the DCP. Likewise, the request to send line 81 from the data set is passed to the adapter cluster over line 185 through AND gate 159. The receive and transmit clock pulses on lines 83 and 85 respectively are fed to the adapter cluster module over line 187 through AND gates 161 and 163. AND gate 161 is enabled whenever the level on the request to send line 81 is low, thereby indicating that the terminal is receiving data. AND gate 163 is inhibited whenever the level on line 81 is low. Conversely when request to send line 81 is high AND gate 163 is enabled and AND gate 161 is inhibited. Thus, when the data processor is receiving data from the terminal unit, the clock pulses on clock pulse line 187 are receive clock pulses. When the data processor is transmitting data to the terminal unit, the clock pulses on line 187 are transmit clock pulses. These pulses are appropriately utilized in the adapter cluster module to strobe the data, as explained in the aforementioned patent to Wollum (U.S. Pat. No. 3,618,037).

Line 191 is always true during DESN time. It is supplied to an adapter cluster module 43 to allow the cluster to be ready to receive information from the DLM. The DLM of FIG. 3 is always in the state of receiving information. Thereby, data set ready line 191 is true to allow the adapter cluster to process the information.

Data line 195 to the adapter cluster module 43 transfers data in serial bit-by-bit fashion from the line adapter being monitored to the adapter cluster module. The data on line 195 will alternately be transmit and receive data, depending upon whether AND gate 131 or AND gate 129 is enabled. For the EIA mode, AND gate 181 is enabled every time a designate signal is sent over line 193 from the adapter cluster module. Since the DLM is always in the receive mode, line 189 which is the carrier detect line that is fed to the carrier detect logic of the adapter cluster module will be high, thereby indicating that there will be a continual flow of data to the cluster module. There are times, however, when line 89 is not high, as noted below.

When a synchronous communication link is being monitored by the DLM, an indication that a line turnaround has occurred must be given to the adapter cluster module. In other words, every time that a terminal ceases transmitting and starts receiving or vice versa, an indication of this fact must be given to the adapter cluster module. It is also a line condition of much interest to a trouble-shooter and one that needs to be indicated when monitoring a line. To indicate to the cluster and ultimately the DCP when this line turnaround occurs, a latch 137, two multivibrators 139, 141, and a NOR gate 143 are utilized to look at the request to send (CAI) line 81 and generate an interrupt in the carrier detect (CF) line 189 every time that the request to send line 81 changes its level, thereby indicating that the data processor is changing from a receive to transmit or transmit to receive mode. This interrupt of the carrier detect line 189 to the adapter cluster module is utilized by the DCP to resynchronize the cluster to a new set of receive clocks.

Figure 4:
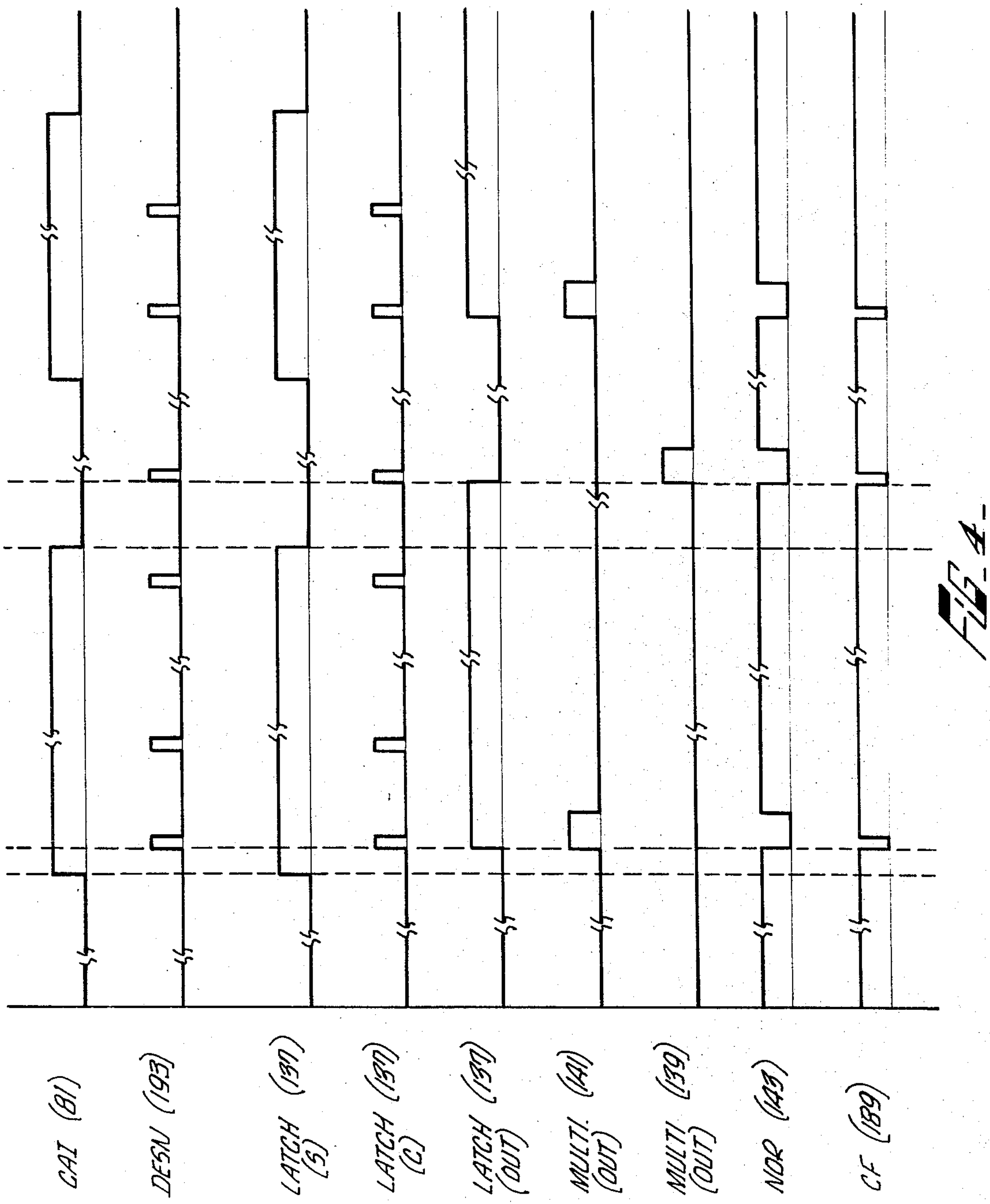
FIG. 4 is a signal level diagram of signal levels at various locations in the line monitor circuitry of FIG. 3 during its monitoring operation.

The manner in which an interrupt is generated on the carrier detect line 189 in response to a change of level on the request to send line 81 will now be explained with reference to FIG. 4 which illustrates the signals at various points in the logic circuitry of FIG. 3. FIG. 4 illustrates the interrelationship of the pulses and levels on the various lines and at the inputs and outputs of the logic elements involved and should not be construed to illustrate any particular sequence of operation.

Whenever the level on the request to send line 81 is low, indicating that the terminal is in a receive mode, the set input (S) on latch 137 is low. Therefore, the output of latch 137 will remain low every time a designate pulse appears at the clock (C) input of latch 137. Under these conditions, the outputs of multivibrators 139 and 141 will be low. They will remain low so long as the output latch 137 is low. Multivibrator 139 is designed to trigger on a change of state at its input (A) from a high to a low. Multivibrator 141 is designed to trigger on a change of state at its input (B) from a low to a high. Therefore, as long as no changes occur at their respective inputs the, multivibrators have low outputs, and NOR gate 143 has a high output that enables AND gate 165. AND gate 165 generates a high every time a designate signal comes from the cluster module over DESN line 193.

Assuming now that there is a change of level on request to send line 81 from a low to a high, as illustrated in FIG. 4, AND gate 123 (FIG. 3) will have a high output. The set input (S) of latch 137 will follow the level of line 81 and have a high input as long as the request to send level remains high. The first time a designate pulse is sent to the DLM from the cluster module, it will clock latch 137. Since the set input (S) is still high, the output of latch 137 will go from a low to a high. Because of this transition in the output of latch 137, multivibrator 141 has a pulse of a certain duration, as determined by its RC time-out elements. During the time that multivibrator 141 has a high output, NOR gate 143 is inhibited, thereby inhibiting AND gate 165 for this period. While all this is going on, multivibrator 139 has not changed its output, because it only responds to level changes that go from a high to a low. Because AND gate 165 is inhibited for this short period by the output of NOR gate 143, the occurrence of a designate pulse during this time will not cause the character detect line 189 to go high, as in the past, thereby generating a break in the normally high level received by the adapter cluster module over line 189. This break indicates that a change of direction in the data flow has occurred. Even though the output of latch 137 remains high, multivibrator 141 times out, placing a low at its output, thereby causing NOR gate 143 to again have a high output which in turn enables AND gate 165, causing a high to be generated on carrier detect line 189 the next time a designate pulse is sent to the DLM by the adapter cluster module.

This sequence continues until the level of the request to send line 81 changes from its high state to a low state, thereby indicating that instead of transmission, reception is going to again take place. At the occurrence of this level change, the set input (S) of latch 137 goes from a high to a low. The next time that a designate pulse is sent from the adapter cluster to the DLM, it clocks the latch 137 at its clock (C) input to cause the output of the latch 137 to go from a high to a low. Because of this change in level of the output of the latch 137, multivibrator 139 is triggered and generates a timed pulse having a duration determined by its RC timing elements, thereby inhibiting NOR gate 143 for this period. Since NOR gate 143 is not generating a high level for a certain period, AND gate 165 is inhibited for this period; and, upon the occurrence of a designate pulse during this time, the level of line 189 will not be high, as is normally the case, but will be low, thereby indicating a change in the level of the request to send line 81. This break in the normally high level of line 189 indicates that a change of direction in the data flow has occurred.

Thus, as illustrated in FIG. 4, every time the level on the request to send line 81 changes level an interrupt is generated on the carrier detect line 189 to the adapter cluster module. This interrupt is observed by the DCP and is utilized by the processor to ensure that resynchronization takes place.

When the DLM is monitoring an asynchronous communication link, the operation of the latch multivibrators and NOR gate are not inhibited. Thus, the turnaround indication is still generated. However, when receiving data from an asynchronous link, the DCP will make note of the line turnaround but will not look for synchronous pulses to resynchronize itself. The operation of the DCP in response to the signals received from the DLM by way of the adapter cluster module will be hereinafter explained and is disclosed in much greater detail in copending application entitled Monitored Data Message Forming Procedure by Karl Erick Volk having U.S. Ser. No. 257,579, and assigned to the Assignee of this application.

If the selector of switch 153 is placed in the receive (REC) position while the selector in switch 155 is still in the EIA position, NOR gate 145 will be inhibited because of the high voltage level placed at one of its inputs. The consequent low output of NOR gate 145 inhibits AND gate 129 which thereby blocks the data transmit line 87 from being routed to the adapter cluster module. The data receive line 89, however, is not blocked and will be permitted to pass data to the adapter cluster module. Thus, only received data is monitored. If the selector of switch 153 is placed in the transmit (TRANS) position of switch 153 one of the inputs of NOR gate 147 has a high placed on it. AND gate 131 is therefore inhibited causing the data receive line 89 to be blocked. Thus, only transmitted date is monitored.

Assuming now that the selector of switch 155 is placed in the current position (I), this effectively disconnects the positive voltage level from the switching logic section 75 of the DLM. With this positive level disconnected, AND gates 121, 123, 125, and 127 are inhibited. AND gate 129 is also inhibited because the request to send line 81 is at a low whenever a direct connect current link is being monitored. A low on line 81 causes a high at one of the inputs of NOR gate 145 which causes NOR gate 145 to have a low output, thereby inhibiting AND gate 129. Because the request to send line is low, a low is also placed at one of the inputs of NOR gate 147 whose other input is also low, thereby causing gate 147 to generate a high output that enables AND gate 131. The communication line of a direct connect current link is connected to the data receive (RXI) line 89. The signals on the current link are, therefore, passed through the DLM to the adapter cluster module by way of AND gate 181 in a manner previously explained. Because the control line inputs 79, 81, 83, 85 and the transmit line 87 are inhibited, the control line outputs 183, 185, 187 are at a low, when a direct connect current link is being monitored. With the selector of switch 155 in the current (I) position, it is irrelevant whether the selector of switch 153 is in the REC or TRANS or BOTH position. Since only AND gate 131 will be enabled in either of the three positions, both receive and transmit data will always be monitored from a direct connect two-wire current line.

Assuming now that the selector of switch 155 is placed in the voltage (V) position, a high signal level is placed on one of the inputs of NOR gate 147 through isolation diode 151, thereby inhibiting AND gate 131 because of the low output of NOR gate 147. In addition, AND gates 121, 123, 125 and 129 are inhibited as explained above in connection with the current position (I) of the selector switch 155. AND gate 133, because of a positive voltage level being placed at one of its inputs through the selector switch 155, is enabled and permits the passing of signals from the direct voltage interface (DIOL) line 91 to the adapter cluster module through AND gate 181, as previously explained. Here again, the position of the selector of switch 153 is irrelevant. Both transmit and receive signals will always be monitored from a direct connect two-wire voltage line.

The data received by an adapter cluster module such as 43 for example, from the DLM 63 (FIG. 1) is passed to a DCP, such as 39 for example (FIG. 1). The data communication processor, as mentioned earlier, is a small computer that contains only sufficient registers and logic to perform all the basic functions associated with the sending and receiving of data. The DCP carries on this operation independently but under the supervision of the modular data processor 11 (FIG. 1).

Figure 5:
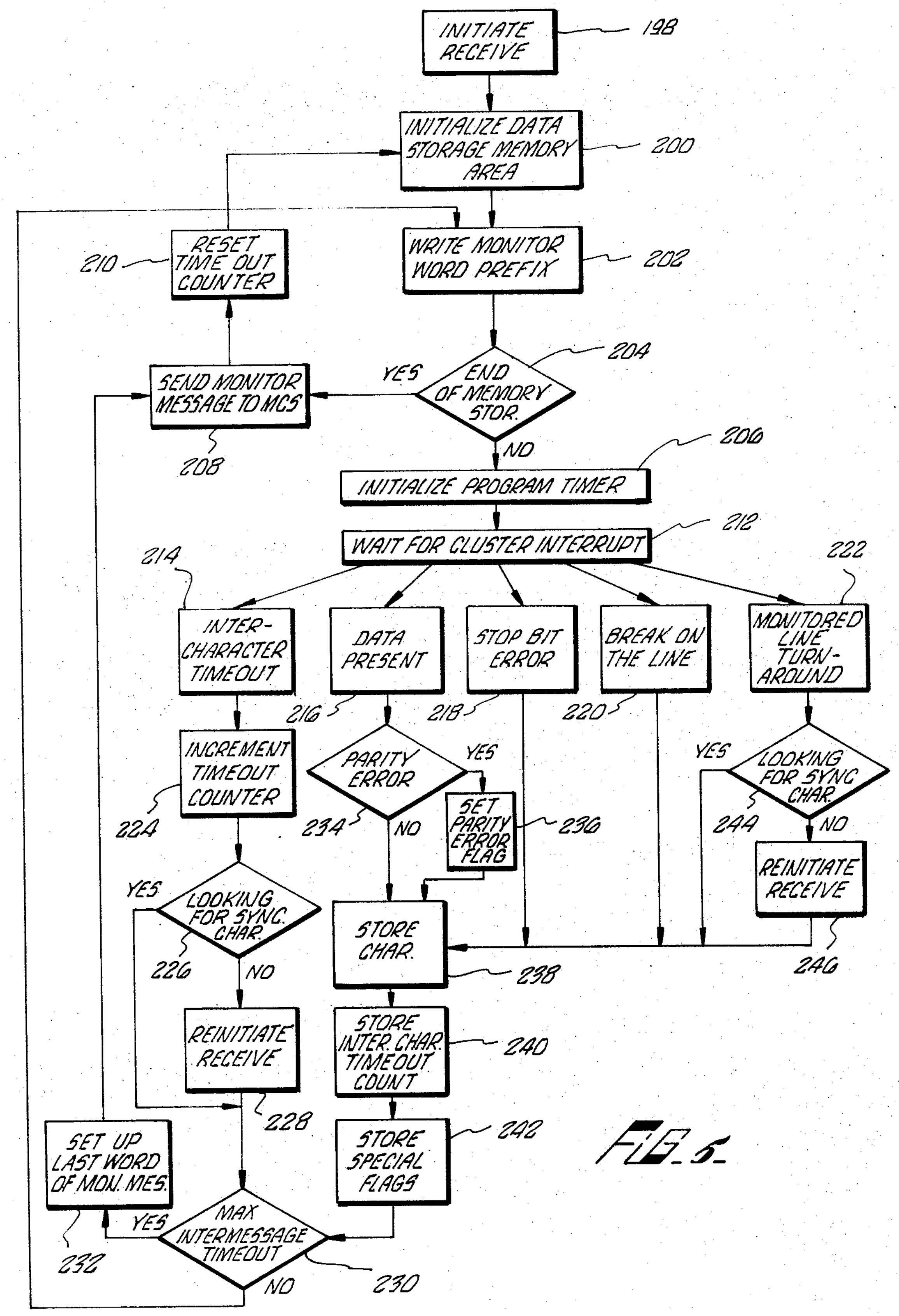
FIG. 5 is a flow chart illustrating the function of part of the I/O circuit of the central computer system when handling data received from the DLM.
Figure 7:
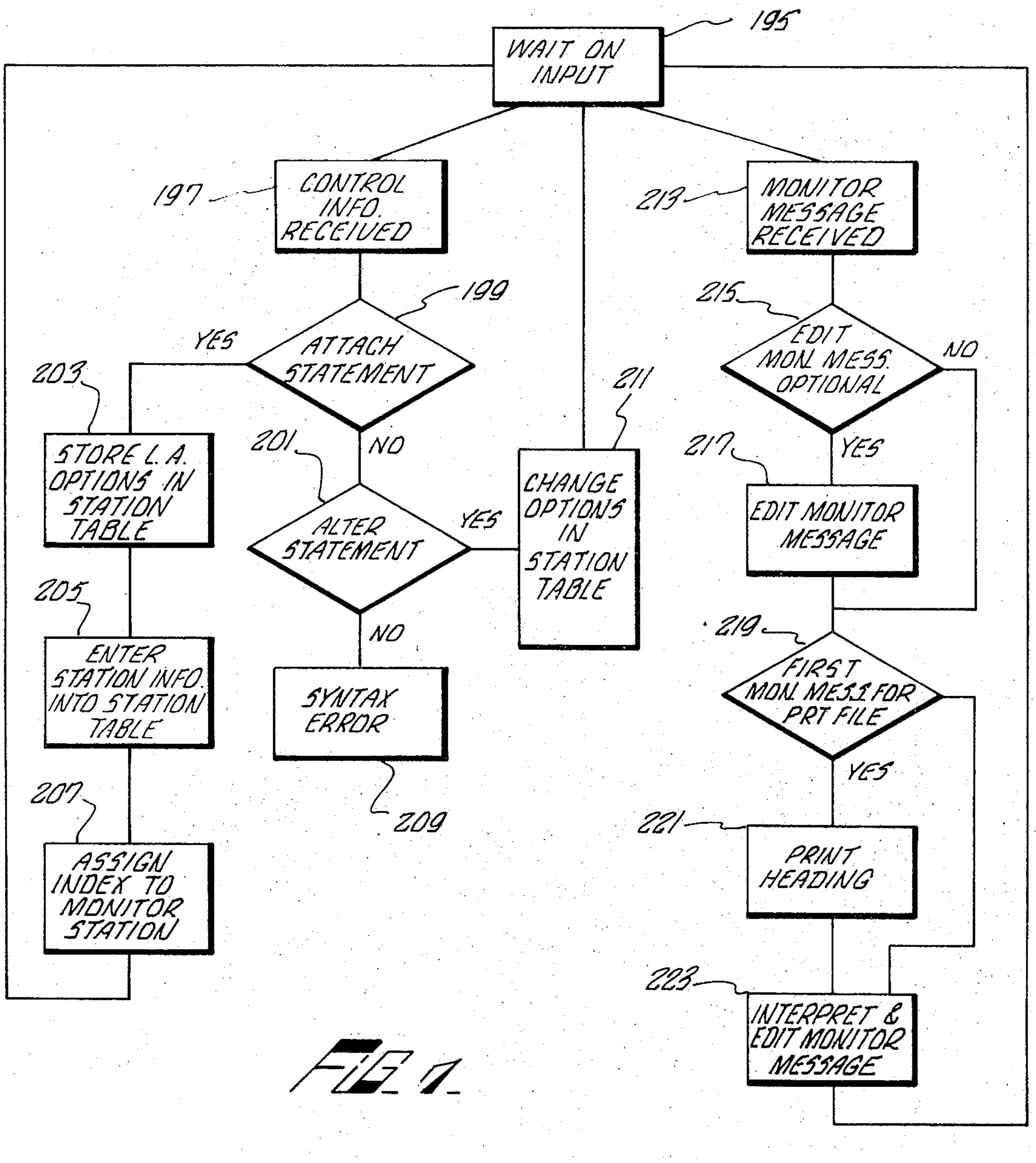
FIG. 7 is a flow chart illustrating the function of a central data processor when handling the messages formed by the I/O circuit process of FIG. 5.
Figure 6A:
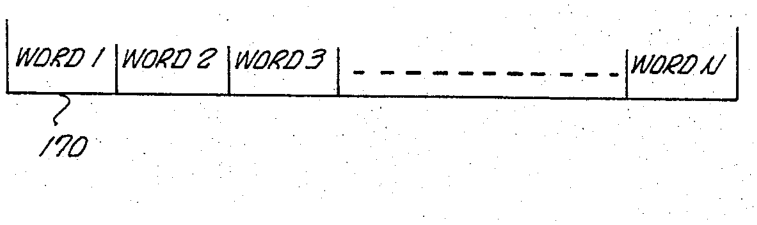
FIG. 6A is an example of the format of a message of monitored data formed by the I/O circuit process of FIG. 5.
Figure 6B:
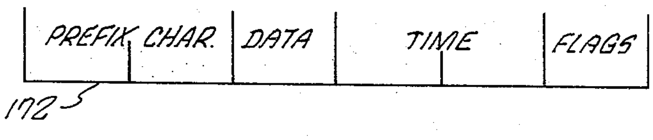
FIG. 6B is an example of the format of a word containing monitored data formed by the I/O circuit process of FIG. 5.

The data communication processor will follow the procedure set forth by the flow diagram of FIG. 5 when handling monitored information from a data line monitor. It must be remembered that the DLM is controlled by the DCP through the adapter cluster module. Exactly how this is done is explained in the previously noted patent to James E. Wollum (U.S. Pat. No. 3,618,037). The particular procedure followed by the DCP, illustrated in FIG. 5, for handling information from a DLM results in an end product which can, for convenience sake, be called a message. FIG. 6 illustrates the format of a message that would be structured by the procedure of FIG. 5. This message consists of N number of words 170. FIG. 6B illustrates the general format of each word in the message. The word may be six bytes long, each byte 172 being 8 bits long. The word consists of a prefix character which in FIG. 6B is shown as being two bytes long, a data character, one byte long, a time character shown as two bytes long, and a flag character shown as one byte long. It should be remembered, however, that the specific length allocations and arrangements of prefix, to time, to flag characters may vary as desired or as dictated by the particular hardware utilized, such variation being well within the purview of a person of ordinary skill in the art.

The data communication processor, DCP 39 for example, starts the structuring of the DLM message that is to be sent to the central data processor 11 (FIG. 1) by an initiate receive operation 198. This simply involves instructions by the DCP to the adapter cluster module 43 to initiate the receive status of a DLM. The cluster accomplishes this task by simply bringing up all the control lines of the DLM. One of the ways the cluster module knows that the DLM is ready to send information to the cluster is by looking at the DLM carrier detect line 189. Once the DCP is informed that the DLM is ready to receive data, it goes into an initialize data storage memory area operation 199. This procedure is a memory allocation operation, well known in the art, that provides space in main memory for a DLM message N words long. Having completed the initialize data storage memory area operation, the DCP proceeds to a write monitor word prefix operation 202. As was seen in FIG. 6B the prefix character could be two bytes long. It may be only one byte long, if desired. The prefix consists of a series of ones or zeros and is written as the leading character of a word. This word may be the first word in a message, the last word in a message, somewhere in between, or the first word of a next message.

If the prefix which is the first character in a word appears to be going into a space in main memory that follows the last word of a message, in other words, outside the space allocated in main memory for a message, and end of memory storage test 103 detects this condition. The condition of an overflow of the memory space allocated to the data line monitor message is accomplished by a comparison between the number of bytes already stored in the allocated memory space and the total number of bytes allocated for a message in memory. If the two counts are equal, this indicates that the memory space allocated for a DLM message is full.

If the end of memory storage test operation 204 results in an indication that all of the main memory area allocated for the DLM message is full, a send monitor message to the message control system (MCS) operation 107 is started. The MCS, as will be hereinafter explained, is a small part of the operation of the central data processor which is concerned with processing the messages received from the DCP. The central data processor concerned with the DCP–DLM messages, hereinafter referred to as MCS, is advised by the DCP that a DLM message in main memory is ready for it to operate on. This is accomplished in a standard way, by placing the message to be operated on in the primary queue of the MCS. After a monitor message is placed in the primary queue of the MCS, the next operation 210 of the DCP is to reset the timeout count generated by a counter in the cluster module. After this operation, the DCP goes back to the initialize data storage memory area operation 200 to again initialize a data storage area in main memory in preparation for the next message.

However, if the end of memory storage test operation 204 produces a result indicating that there is more space available in the message area allocated for the DLM message, the DCP will start an initialize program timer operation 206, which is simply a command from the DCP to the cluster module timer to produce an interrupt after a certain amount of time has elapsed, which, for example, could be ten milleseconds in duration. Upon completion of this operation, the DCP goes into a wait for cluster interrupt state 212. This requires that the DCP wait for one of five interrupts to occur. The five interrupts the DCP will respond to are an intercharacter time-out interrupt, a data present interrupt, a stop bit error interrupt, a break on the line interrupt and a monitored line turn-around interrupt. Only one of these five interrupts will occur first. These interrupts are mutually exclusive and two or more will not occur simultaneously because of the serial communication scheme between the DLM and the cluster.

Assuming that a data present interrupt occurs first, the DCP will go into the data present operation 216. The data present interrupt is implemented by the cluster sending a CAN signal to the DCP, letting it know that a data byte is ready for transfer from the cluster to the DCP. In response to this interrupt, the DCP takes the data from the appropriate cluster register, temporarily storing the data byte in a storage means within the DCP. Having acquired the data byte the DCP runs a standard parity error check operation 234 on the data. It should be understood that either vertical or horizontal parity checks may be performed by the DCP. If the parity error check produces a result that indicates a parity error has occurred, the DCP will go into a set parity error flag operation 236. This operation merely involves the temporary storage of a signal that indicates that a parity error has occurred on this data byte. If no parity error indication is produced by the parity error check 234 the DCP goes into a store character operation 238. This operation involves storing the data byte received by the DCP nex to the word prefix that was previously written in the main memory area allocated to the DLM. The store character operation 238 is also the next step after a set parity error flag operation 236.

Subsequent to the data byte being stored in its appropriate location in a main memory of the data processing system 11 (FIG. 1), the DCP embarks on a store intercharacter time-out count operation 240 which involves transferring the count of the number of times an intercharacter time-out pulse was received from the timer in the adapter cluster module 43 (FIG. 1) between the transfer of the last DLM message to the MCS and the occurrence of the present data byte or flag byte. Subsequent to the transfer of the timeout count byte to main memory of the central data processor, the DCP goes into the store special flags operation 242. The operation involves checking the temporary storage of the DCP for any parity error that might have been associated with the data byte. If, rather than a data byte occurring first, a stop bit error, or a break on the line, or a line turnaround, had occurred first, then, characters indicating that one of these interrupts had occurred would be placed in the flags location of the particular word in the DLM message location of main memory.

Assume, for example, that instead of a data present interrupt, the DCP receives a stop bit error interrupt. The DCP will thereupon go into stop bit error operation 218. A stop bit error interrupt is generated only when a DLM is monitoring an asynchronous line, since only asynchronous data transmission utilizes start and stop bit characters. If the DLM comes across something that is not data and is not the required stop bit character which is placed at the end of every asynchronous message, the adapter cluster module generates a stop bit error interrupt for the DCP. The DCP, upon receiving this interrupt, places an indication of that fact into a temporary store. The DCP then goes into a store character operation, during which a meaningless data byte is stored in main memory because none was received by the DCP at this particular time. The DCP then goes into the store intercharacter timeout operation 240 which was explained above. Thereafter, the DCP goes into the store specified flags operation 242, during which the stop bit error flag character from temporary store in the DCP is transferred into the appropriate main memory location of the central processor. The DCP would then go into a maximum intermessage timeout check 230 which will be hereinafter explained.

Assume now, that instead of a data present interrupt, an intercharacter timeout interrupt had been received while the DCP was waiting for a cluster interrupt. When an intercharacter timeout interrupt is received, the DCP goes into an intercharacter timeout operation 214 which is followed by an increment timeout counter operation 224. This step simply involves incrementing the count of timing pulses received by one, that are stored in temporary storage in the DCP. This count keeps track of the number of times an intercharacter timeout interrupt is received from the program timer in the adapter cluster module, which may as earlier explained, be set to a ten millesecond time duration. Subsequent to the increment timeout counter operation 224 being executed, a looking for synch character test 225 is initiated, if the DLM is monitoring a synchronous communication link. Assuming, for the present, that such is the case, if the result of the inquiry is an indication that no sync characters are forthcoming, then a reinitiate receive operation 228 is instituted. This operation is the same as the initiate receive operation 198 explained earlier. If the looking for sync character test 226 produces a result that indicates that sync characters are forthcoming, then the reinitiate receive operation 228 is not instituted and the DCP sits there waiting for something else to happen, like a data byte of information to be transferred over by the adapter cluster module.

If after a certain arbitrary period of time, for example ten seconds, no data bytes or flag interrupts occur, the DCP goes into a maximum intermessage timeout test 230. If the test indicates that 10 seconds have elapsed since the last data byte or flag occurred, the DCP will go into the set-up last word of monitor message operation.

During this operation, the DCP will store a meaningless data byte, the intercharacter timeout count and a last word flag, in main memory. Upon the completion of a message unit, the DCP places the message in the primary queue of the MCS, as was explained earlier. If however, the maximum intermessage timeout test results in an indication that no maximum intermessage timeout has occurred, a monitor word prefix will be written into the memory location of the central data processor, as was explained earlier in connection with write monitor word prefix operation 202, and the DCP will wait for another cluster interrupt after running through operations 204 and 206, as explained earlier.

Assuming now, that while the DCP is waiting for a cluster interrupt a break on the line interrupt occurs, the DCP would go into a break on the line operation 220. A break on line is either a continuous series of ones or zeros which are, as is well known, indicated by a high or low on the line. If such an interrupt is sent to the DCP from the cluster module, the DCP will temporarily store information indicating the occurrence of that condition and will proceed to the store character operation 238, the store intercharacter timeout count 240, and the store special flags operation 242. At operation 242, the break on line indication is transferred from storage in the DCP to the appropriate area in main memory allocated to the data line monitor message.

Assuming that the DCP is waiting for a cluster interrupt and a monitored line turnaround interrupt is sent to the DCP by the adapter cluster module, the DCP will go into a monitored line turnaround operation 222. This interrupt indicates, as was explained earlier, that the data being transmitted on the monitored line has changed direction from transmit to receive or receive to transmit. When such a condition occurs and the line being monitored is a synchronous line, a resynchronization must take place. Therefore, the DCP goes into a looking for sync characters test 244. If sync characters are detected, the DCP goes into the store characters operation 238, the store intercharacter timeout count operation 240, and the store special flags operation 242. During this operation, the monitored line turnaround flag is transferred into appropriate location of main memory. If however, no sync characters are found, the DCP goes into a reinitiate receive operation 246 which is identical to the reinitiate receive operation 228, and the initiate receive operation 198.

As was mentioned earlier, the looking for sync character tests 226, 244 and the reinitiate receive operation 228, 246 are used only when the DLM is monitoring a synchronous link. To prevent the DCP from going through these operations when an asynchronous communication link is being monitored, the DCP is directed, in a manner that will be hereinafter explained to choose an asynchronous procedure which is not shown but is similar to the procedure of FIG. 5 except that the looking for sync character tests 226, 244 and the reinitiate receive operation 228, 246 are absent. In other words, in an asynchronous mode, the DCP would go from an increment timeout counter operation 224 directly to a maximum intermessage timeout check 230 and from a monitored line turnaround operation 222 directly to a store character operation 238.

Whenever a message is completed with the requisite number of words, as indicated by the end of memory storage test 204, the DCP goes into the send monitor message to MCS operation 208. During this operation, the message is placed in the primary queue of the MCS in the central data processor 11 (FIG. 1). The MCS operation of the central data processor consists of checking its primary queue for monitor message from the DCP. This is the wait on input operation 196 of the MCS procedure that is run along with the other procedures of the central multiprocessing unit 11 of FIG. 1. If the MCS determines that a monitor message has been received, the MCS goes into its monitor message receive operation 213 during which it identifies the particular DLM to which this message belongs. Thereupon, the MCS goes into its edit monitor message option test 215. This test simply involves looking at a station table to see if editing of messages from this particular DLM is desired. A station table, as is well known, is simply a memory location in which data is stored indicating certain operations that are to be performed. If the edit monitor message option test results in an indication that the message received is to be edited, the MCS goes into the edit monitor message operation 217 which involves the processing of only those words in a message that follow a designated start character and come before a designated end character. The definition of the start character and the end character is dictated by the information in the station table. If the edit monitor message option test 215 results in an indication that a message should not be edited, the MCS goes into a first monitor message for print file test 219. This stage simply involves a test to see if this particular message is the first message received. This information is indicated by a boolean. If the result of the check indicates that indeed this is the first message received by the MCS, then the MCS goes into a print heading operation 221. An example of the heading printed out under the direction of the MCS over a line printer, such as printer 31 (FIG. 1), is illustrated immediately following the explanation of the interpret and edit monitor message operation 223. Generally, during the print heading operation, the MCS directs a data line printer attached to the local I/O bus of the multiprocessor unit 11 to print out the headings of time, in hours, minutes and seconds, of time pause between character strings, of character strings represented mnemonically and hexadecimally, and the DLM name from which this data is coming.

After this is done the MCS goes into the interpret and edit monitor message operation 223. During this operation, the MCS generally looks at the message word by word. The MCS acquired the station identification from a station table during the monitor message receive operation 213 and will output it as MONITOR 1, for example, as illustrated in a below located printout. The MCS also looks at the time bytes of each word to determine the hours, minutes, seconds, and the pause between character strings. It looks at the flag bytes to determine what interrupts had occurred. It looks at the data byte to determine what data has been transmitted. It takes the flag byte and/or the data byte and translates it by way of a look-up table, into mnemonic and hexadecimal code for printout.

An example of a printout of data monitored on a communication link where the data is going back and forth between a terminal and a central processor on an asynchronous long-distance data communication link is shown below.

```
****************************** LINE ANALYSIS ******************************
MCS RECVD Q   PAUSE BETWEEN   CHARACTER STRING MNEMONIC   CHARACTER STRING IN HEX              STATIONNAME
HR  MIN  SEC  CHAR. STRINGS
17 : 19 : 22     60 MILLI     STX H E L L O ...           02 C8 C5 D3 D3 D6 40 E3 C8 C9 E2 40  MONITOR1
17 : 19 : 23                                              C9 E2 40 C1 40 C3 D6 D5 D9 C1 C3 40  MONITOR1
                                                          E2 C5 D5 C4 C9 D5 C7 40 E8 D6 F4 40
                                          ETX             C1 40 D4 C5 E2 E2 C1 C7 C5 03
                 60 MILLI     STX H E L L O ...           02 C8 C5 D3 D3 D6 40 E3 C8 C9 E2 40
17 : 19 : 23                                              C9 E2 40 C1 40 C3 D6 D5 D9 C1 C3 40
                                                          E2 C5 D5 C4 C9 D5 C7 40 E8 D6 F4 40  MONITOR1
                                          ETX             C1 40 D4 C5 E2 E2 C1 C7 C5 03
                 60 MILLI     STX H E L L O ...           02 C8 C5 D3 D3 D6 40 E3 C8 C9 E2 40
                                                          C9 E2 40 C1 40 C3 D6 D5 D9 C1 C3 40
                                                          E2 C5 D5 C4 C9 D5 C7 40 E8 D6 F4 40
17 : 19 : 23                              ETX             C1 40 D4 C5 E2 E2 C1 C7 C5 03
               1150 MILLI     STX         ETX             02 40 40 40 C2 D3 C1 40 40 03        MONITOR1
                 60 MILLI     STX H E L L O ...           02 C8 C5 D3 D3 D6 40 E3 C8 C9 E2 40
                                                          C9 E2 40 C1 40 C3 D6 D5 D9 C1 C3 40
17 : 19 : 23     60 MILLI     STX                         E2 C5 D5 C4 C9 D5 C7 40 E8 D6 F4 40
                                                          02 C8 C5 D3 D3 D6 40 E3 C8 C9 E2 40  MONITOR1
                                                          C9 E2 40 C1 40 C3 D6 D5 D9 C1 C3 40
                                                          E2 C5 D5 C4 C9 D5 C7 40 E8 D6 F4 40
17 : 19 : 23     60 MILLI     STX H E     ETX             C1 40 D4 C5 E2 E2 C1 C7 C5 03
                                                          02 C8 C5 D3 D3 D6 40 E3 C8 C9 E2 40  MONITOR1
                                                          C9 E2 40 C1 40 C3 D6 D5 D9 C1 C3 40
                                                          E2 C5 D5 C4 C9 D5 C7 40 E8 D6 F4 40
                 60 MILLI     STX H E     ETX             C1 40 D4 C5 E2 E2 C1 C7 C5 03
                                                          02 C8 C5 D3 D3 D6 40 E3 C8 C9 E2 40
17 : 19 : 23                                              C9 E2 40 C1 40 C3 D6 D5 D9 C1 C3 40
                                                          F2 C5 D5 C4 C9 D5 C7 40 E8 D6 F4 40  MONITOR1
                                          ETX             C1 40 D4 C5 E2 E2 C1 C7 C5 03
                 60 MILLI     STX H E L L O ...           02 C8 C5 D3 D3 D6 40 E3 C8 C9 E2 40
                                                          C9 E2 40 C1 40 C3 D6 D5 D9 C1 C3 40
                                                          F2 C5 D5 C4 C9 D5 C7 40 E8 D6 F4 40
```

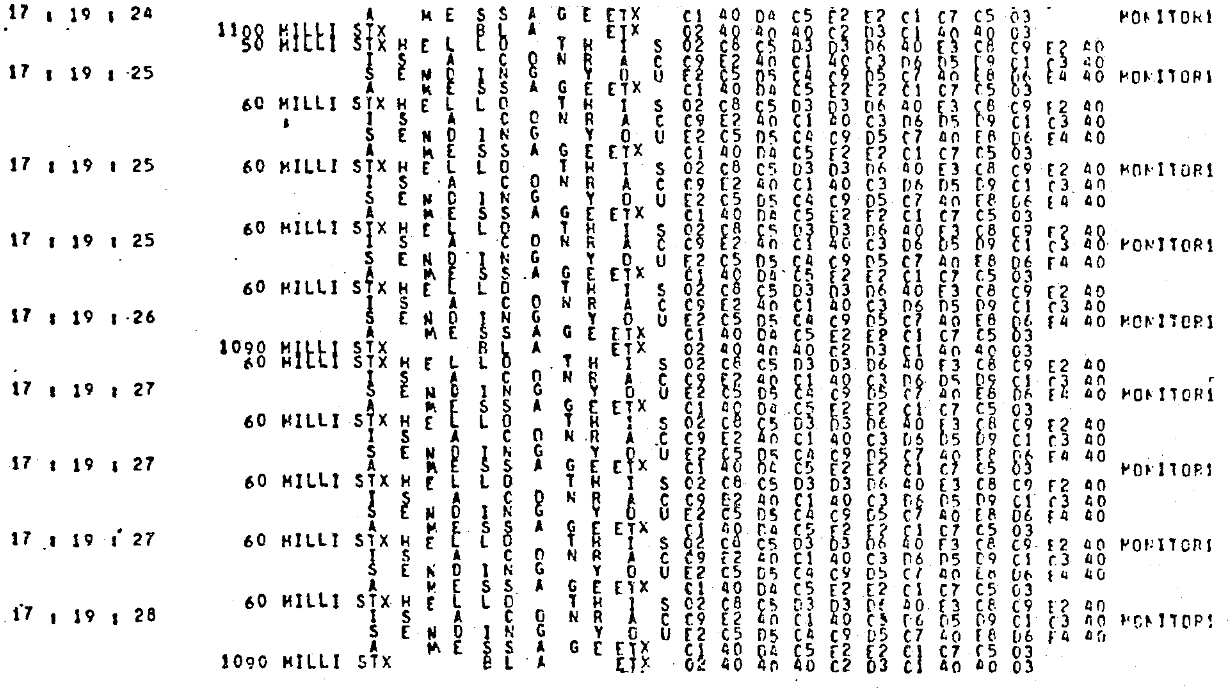

After the interpret and edit monitor message operation 223, the MCS goes back to check its primary queue for another monitor message to process.

Assuming now that instead of finding a monitor message in its primary queue, the MCS finds a control message, the MCS would then go into a control information receive operation 197. During this operation, the MCS receives control information from a remote terminal or an input device such as a card reader at the central data processor 11. The control information could indicate that a particular DLM is going to be monitoring a particular data communication line, or the control information may be an alter option statement. In either case, the MCS goes into the attach statement test 149. If the test determines that the control information received indicates that a new DLM is to be attached to the system and that it is going to be monitoring a certain type of communication link, the MCS goes into the store line analyzer options in station table operation 203.

During the store line analyzer options operation 203, the editing option and line turnaround indication option, if desired, is entered into the station table in an appropriate location. The MCS will then go into an enter station information into station table operation 205, during which operation, all information dealing with the characteristics of the particular link that is being monitored are stored. In order to prevent confusion in the printout between the different DLMs operating at the same time, the MCS assigns an index number to each monitor station during the assign index to monitor station operation 207. Subsequent to operation 207, the MCS goes back to look at its primary queue to see if it has a message or some control information to process. If desired, during the assign index to monitor station operation 207, information may be entered in the station table instructing the MCS to cause a printout related to this station at a particular output device (line printer) located either locally or at the remote terminal which is attached to the communication link that the DLM is sampling.

Assuming that the attach statement test 199, instead of resulting in an indication that an attach statement was present, resulted in an indication that no attach statement was present, the MCS would go into an alter statement test 201, whereupon it would determine whether an alter statement was present or not. If no alter statement was present, the MCS would go into a syntax error operation 259, which simply involves directing the printout of a syntax error indication. In most cases, however, if an attached control statement is not present an alter control statement will be, and in such a case the MCS would go into a change options in station table operation 211. This operation could involve removing the editing feature redefining the area of a monitor message to be edited or removing the line turnaround indicator, for example. This is accomplished by changing the option instructions written into the station table by a previous attach statement. Subsequent to the change in option operation 211, the MCS goes back to its wait on input operation 196, periodically testing its primary queue for a message from a DLM or additional control information.

Referring now to FIG. 8, a scheme for connecting data line monitors 237 and 239 to a full duplex communication link for monitoring the full duplex link is disclosed. Assuming that terminal 225 is a full duplex terminal and data sets 227, 231 are adapted for full duplex operation, a four cabled public or private line 229 is necessary, two cables for receiving, two cables for transmitting. At the system side of data set 231, data line monitor plugs 233 and 235 would plug into the receive and transmit lines respectively of data set 231. Full duplex operation requires a receive adapter 243 and a transmit adapter 241. Thus, because one full duplex communication link requires two line adapters, two DLMs are necessary for monitoring such a link.

Referring now to FIG. 9, another example of how a data line monitor may be connected into a communication link to monitor information on that link is seen. Assuming that the communication link is a half duplex line, terminal unit 245 being a terminal for half duplex data communication, it may become desirable to monitor data at the terminal side of the communication link in addition to or separately from monitoring data at the system side of the communication link. The interface unit 247 would tap into the communication link between terminal 245 and the terminal data set 249. This interface unit would necessarily be required to have some logic for interfacing the data set and the terminal. The data tapped off by interface unit 247 is then transmitted by way of data sets 259 and 261 over a long distance line to a DLM 263 which interfaces with an adapter cluster module. If desired, in addition to monitoring data at the terminal side of the link, data at the system side may also be monitored by tapping the communication line between a data set 251 and a line adapter 251 at the system side. Data line monitor 255 would feed data monitored at line adapter 257 to the adapter cluster module into the DCP. Data set 249 and 251, of course, modulate and demodulate the communication data being exchanged between the terminal 245 and the central system through line adapter 257. If the communication line bracketed by data sets 249 and 251 is not too long, a direct connect line may be used instead of data sets 259 and 261 thereby considerably reducing the cost of monitoring at the terminal end.

In summary, therefore, it can be seen that this invention provides a trouble-shooting tool that generates a printout of line events occurring on the data line being monitored in such a way that referral to past data transmissions and to data transmission as they are occurring can be easily made with constant reference to the time of their occurrence and the flexibility of being capable of use on different types of communication links. Obviously, many modifications and variations of the present invention are possible in the light of the above teachings. It is, therefore, to be understood that within the scope of the independent claims the invention may be practiced otherwise then as specifically described. For example, the DLM circuitry could be expanded to permit the sensing of the change of state of control lines as well as data lines, or a single DLM could be adapted to be sequentially or intermittently switched into connection with a plurality of communication lines.

What is claimed is:

1. A dynamic trouble-shooting tool for aiding in the detection of problems in half-duplex communication links between a central data processor and a terminal, comprising:

means for monitoring binary data and control signals on a said communication link, means for interfacing the monitored signals with an input/output circuit of the central data processor; and means in said central data processor and said input/output circuit for translating said signals into code messages, and causing these messages to be displayed, along with the time of day said signals were received by said central processor means and the time differential between the displayed code messages.

2. The trouble-shooting tool of claim 1 wherein said monitoring means includes high impedance means connected to the signal lines being monitored.

3. The trouble-shooting tool of claim 1 wherein said monitoring means includes signal level changing means for restricting signal level swing to within a desirable range.

4. The trouble-shooting tool of claim 1 wherein said interfacing means includes means for indicating to said input/output circuit when the direction of data signal flow in the communication link changes.

5. The trouble-shooting tool of claim 4, wherein said indicating means comprises:

means for detecting a change in signal level on a request to send control line in the communication link; and means responsive to this change in signal level for indicating a change in the direction of data signal flow in the communication link.

6. A dynamic trouble-shooting tool for aiding in the detection of problems in communication links between a central data processor and a terminal which may be used on long-distance communication links, direct connect current links, and direct connect voltage links, comprising:

means for monitoring binary data and control signals on one of said type links without loading the circuits in the link;

means for interfacing the monitored signals with an input/output circuit of the central data processor;

means for selectively adapting said interfacing means to function with one of said type communication links; and means in said central data processor and said input/output circuit for translating said signals into code messages, and causing these messages to be displayed along with the time of day said signals were received by said central processor means and the time differential between the displayed code messages.

7. The trouble-shooting tool of claim 6 wherein said selectively adapting means includes;

first switching means for selecting the type communication link to be monitored; and second switching means, operative only when said first switching means is selecting the long-distance link, for selecting whether transmitted signals only, received signals only, or both transmitted and received signals are to be monitored.

8. The trouble-shooting tool of claim 7 wherein said first switching means comprises:

means for activating request-to-send, receive clock, transmit clock, transmit data, and receive data signal lines when the long-distance type communication link is selected;

means for activating only the receive data signal line when the current communication link is selected; and means for activating only a direct input/output voltage line when the voltage communication link is selected.

9. The trouble-shooting tool of claim 8 further comprising means responsive to the signal level of said request-to-send line for causing either the receive clock signal line or the transmit clock signal line to the input/output circuit to be inhibited, depending on the signal level of the request-to-send line.

10. The trouble-shooting tool of claim 6 wherein said interfacing means includes means for indicating to said input/output circuit when the direction of data signal flow in the communication link changes.

11. The trouble-shooting tool of claim 10 wherein said indicating means comprises:

means for detecting a change in signal level on the request-to-send line in the communication link; and means responsive to this change in signal level for indicating a change in the direction of data signal flow in the communication link.

12. A dynamic trouble-shooting tool for aiding in the detection of problems in communication links between a central data processor and a terminal which may be used on synchronous and asynchronous communication links comprising:

means for interfacing monitored binary data and control signals from a synchronous or asynchronous communication link with an input/output circuit of the central data processor;

means for indicating to the input/output circuit when the direction of data signal flow in the communication link changes; and means in said central data processor and said input/output circuit for translating said signals into code messages, and causing these messages to be displayed, along with the time of day said signals were received by said central processor means and the time differential between the displayed code messages.

13. The trouble-shooting tool of claim 12 wherein said indicating means comprises:

means for detecting a change in signal level on a request-to-send control line in the communication link; and means responsive to this change in signal level for indicating a change in the direction of data signal flow in the communication link.

14. The trouble-shooting tool of claim 13 further comprising means responsive to the signal level of said request-to-send line for causing either the receive clock signal line or the transmit clock signal line to the input/output circuit to be inhibited, depending on the signal level of the request-to-send line.

15. A dynamic trouble-shooting tool for aiding in the detection of problems in communication links between a central data processor and a terminal, comprising:

means for monitoring binary data and control signals on a said communication link;

means for interfacing the monitored signals with an input/output circuit of the central data processor;

means in said input/output circuit for forming a message with the monitored digital signals, and means in said central data processor for translating said messages into two display code messages and causing these code messages to be displayed.

16. The trouble-shooting tool of claim 15 wherein said data processor means includes means for editing the messages received from said input/output means.

17. The trouble-shooting tool of claim 16 wherein said data processor means further includes means for activating, inhibiting, and altering said editing means.

18. The trouble-shooting tool of claim 15 wherein said data processor means includes means for retrieving timing information from the messages received from said input/output means and causing it to be displayed in relation to said code messages.

19. The trouble-shooting tool of claim 18 wherein said data processor means further includes means for causing the display of monitor station identification in relation to said code messages.

20. A method for trouble-shooting communication links between a central data processor and a terminal comprising:

monitoring binary signals on a communication link;

translating said signals into code messages;

displaying said code messages; and displaying the time of day said signals were monitored and the time differential between the displayed code messages.

21. The trouble-shooting method of claim 20 further comprising, after the monitoring step and before the translating step, the steps of:

detecting changes in signal level on a request-to-send control link in said communication link; and indicating a change in the direction of data signal flow in response to a detected change in signal level on said request-to-send line as part of the monitored digital signals.

* * * * *